(12) United States Patent  (10) Patent No.: US 8,699,340 B2
Fantaye et al.  (45) Date of Patent: Apr. 15, 2014

(54) TABLE-BASED LINK ADAPTATION FOR WIRELESS COMMUNICATION NETWORK TRANSMISSIONS

(75) Inventors: Girum Alebachew Fantaye, Ottawa (CA); Andreas Molin Edlund, Sandnes (NO); Eugenia Lambiri, Ottawa (CA); Michael McKenna, Richmod (CA); Geoffrey McHardy, Carp (CA); Peter Hazy, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 118 days.

(21) Appl. No.: 13/486,171

(22) Filed: Jun. 1, 2012

(65) Prior Publication Data

US 2013/0322241 A1   Dec. 5, 2013

(51) Int. Cl.
  *G01R 31/08*  (2006.01)
(52) U.S. Cl.
  USPC .......................................... 370/232; 370/252
(58) Field of Classification Search
  USPC .................................. 370/232, 252
  See application file for complete search history.

(56) References Cited

U.S. PATENT DOCUMENTS

| 7,206,332 | B2 | 4/2007 | Kwan et al. | |
|---|---|---|---|---|
| 2003/0202574 | A1* | 10/2003 | Budka et al. | 375/227 |
| 2004/0248520 | A1 | 12/2004 | Miyoshi | |
| 2007/0153672 | A1 | 7/2007 | Terry et al. | |
| 2008/0212539 | A1 | 9/2008 | Bottomley et al. | |
| 2010/0124887 | A1 | 5/2010 | Wellington | |
| 2011/0129028 | A1* | 6/2011 | Lee et al. | 375/262 |
| 2011/0243208 | A1* | 10/2011 | Shany et al. | 375/224 |

FOREIGN PATENT DOCUMENTS

| EP | 1 513 272 A1 | 3/2005 |
|---|---|---|
| EP | 1973253 A1 | 9/2008 |
| WO | 2008093945 A2 | 8/2008 |
| WO | 2011032274 A1 | 3/2011 |
| WO | 2011150592 A1 | 12/2011 |

OTHER PUBLICATIONS

International Search Report and Written Opinion dated Sep. 6, 2013 for International Application Serial No: PCT/IB2013/053777, International Filing Date: May 9, 2013 consisting of 11-pages.

* cited by examiner

*Primary Examiner* — Sai-Ming Chan
(74) *Attorney, Agent, or Firm* — Christopher & Weisberg, P.A.

(57) ABSTRACT

A method for link adaptation is provided. Data associated with a user device is stored. A first number of scheduling blocks, SBs, required to transmit the stored data is estimated based at least in part on a first modulation and coding scheme (MCS). The first MCS corresponds to a first channel performance level. A second MCS is determined based at least in part on a link quality. The second MCS corresponds to a second channel performance level. A determination is made whether second channel performance level is less than the first channel performance level. An operating MCS is selected based at least in part on whether second channel performance level is less than the first channel performance level. The data is scheduled for transmission based at least in part on the selected operating MCS.

25 Claims, 6 Drawing Sheets

FIG. 1

| # of SBs \ TBS Index | 1 | 2 | ... | ... | ... | 100 |
|---|---|---|---|---|---|---|
| 0 | $TBS_{0,1}$ | $TBS_{0,2}$ | ... | ... | ... | $TBS_{0,100}$ |
| 1 | $TBS_{1,1}$ | $TBS_{1,2}$ | ... | ... | ... | $TBS_{1,100}$ |
| ... | ... | ... | ... | ... | ... | ... |
| 28 | $TBS_{28,1}$ | $TBS_{28,2}$ | ... | ... | ... | $TBS_{28,100}$ |

Increase Number of SBs →

Increase TBS Index →

| # of SBs / MCS Index | 0 | 1 | ... | 28 |
|---|---|---|---|---|
| 1 | $R_{0,1}$ | $R_{1,1}$ | ... | $R_{28,1}$ |
| 2 | $R_{0,2}$ | $R_{1,2}$ | ... | $R_{28,2}$ |
| ... | ... | ... | ... | ... |
| ... | ... | ... | ... | ... |
| ... | ... | ... | ... | ... |
| 100 | $R_{0,100}$ | $R_{1,100}$ | ... | $R_{28,100}$ |

Increase MCS Index →

Increase Number of SBs →

TABLE-BASED LINK ADAPTATION FOR WIRELESS COMMUNICATION NETWORK TRANSMISSIONS

TECHNICAL FIELD

The present invention relates to wireless communications, and in particular to a device, system and method for performing modified link adaptation.

BACKGROUND

The demands on wireless communication networks as a medium for communicating data has been steadily increasing due in part the exponential growth of mobile device users. In order to accommodate the increased amount of mobile device traffic on the wireless communication network, network operators have been forced implement spectrum resource management techniques to more efficiently use the limited spectrum allocated to them. These efficient spectrum management techniques for wireless communication networks are often referred to as radio resource management (RRM).

Several RRM techniques that have been implemented include dynamic RRM techniques that actively adjust the communication parameters according to traffic load, quality, path loss and interference, among other characteristics. One such RRM technique is referred to as link adaptation in which the purpose of link adaptation is to determine the appropriate modulation and level of error correction coding that is applied to meet a specified target such as error probability. In particular, link adaptation uses information on communication link quality that is obtained either from measurements or from reporting of the channel state information (CSI) by the receiver. Selection of the appropriate modulation and error correction coding for each mobile device allows for the wireless communication network to efficiently manage the spectrum according to wireless communication characteristics.

The amount of time to perform link adaptation for a mobile device is typically confined to a transmission time interval (TTI). The transmission time interval in a 3GPP LTE system is 1 millisecond (ms). A transmission resource of 180 kHz in frequency within one TTI is referred to as a scheduling block (SB) in which, in 3GPP, a physical resource block (PRB) is half a TTI in time or a slot. Moreover, there are several modulation schemes to select from such as quadrature phase shift keying (QPSK), sixteen quadrature amplitude modulation (16QAM) and 64QAM. Each modulation scheme may also include several possible levels of channel coding in which the combination of modulation scheme and coding, i.e., Modulation and Coding Scheme (MCS), provide numerous choices for RRM.

However, link adaptation is not without limits. For example, scheduling and link adaptation typically have to be performed one queue at a time because only after SBs have been allocated to a mobile device are the remaining SBs available for the other queues known to the scheduler. A mobile device can have one or more associated queues thereby making the efficient scheduling of multiple mobile devices even more challenging. In other words, scheduling and link adaptation techniques take into consideration the unallocated scheduling blocks. As such, the number of mobile devices that can be scheduled in a transmission time interval is limited by the processing time required for link adaptation for one mobile device.

Moreover, the task of selecting the optimal MCS and SBs given the numerous choices is often time consuming and further limits the amount of mobile devices that can be scheduled per transmission time interval. For example, a time consuming link adaptation technique may use over half of the transmission time interval to determine the optimum MCS for one mobile device such that link adaptation will not be performed for the other mobile devices because there is not enough time left in the TTI. Moreover, the scheduled mobile devices may not even use the total available bandwidth such that other mobile devices would have been scheduled if the link adaptation process had not consumed so much time. Even if the total available bandwidth is utilized, it is likely that the bandwidth is not utilized efficiently by the scheduled mobile devices.

SUMMARY

The present invention advantageously provides an apparatus, system and method for performing modified link adaptation.

According to one embodiment, a radio resource management apparatus is provided that includes a memory. The memory is configured to store data for transmission associated with a user device. A processor in communication with the memory. The processor is configured to estimate a first number of scheduling blocks (SBs) required to transmit the stored data based at least in part on a first modulation and coding scheme (MCS). The first MCS corresponds to a first channel performance level. A link quality associated with the first number of SBs is estimated. A second MCS is determined based at least in part on the estimated link quality. The second MCS corresponds to a second channel performance level. A determination is made whether the second channel performance level is less than the first channel performance level. An operating MCS is selected based at least in part on whether the second channel performance level is less than the first channel performance level. The stored data is scheduled for transmission based at least in part on the selected operating MCS.

According to another embodiment, a method for link adaptation is provided. Data for transmission associated with a user device is stored. A first number of scheduling blocks (SBs) required to transmit the stored data is estimated based at least in part on a first modulation and coding scheme (MCS). The first MCS corresponds to a first channel performance level. A second MCS is determined based at least in part on a link quality. The second MCS corresponds to a second channel performance level. A determination is made whether second channel performance level is less than the first channel performance level. An operating MCS is selected based at least in part on whether second channel performance level is less than the first channel performance level. The data is scheduled for transmission based at least in part on the selected operating MCS.

According to another embodiment, a non-transitory computer readable medium stores program instructions for performing link adaptation. Execution of the program instructions by one or more processors causes the one or more processors to estimate a first number of scheduling blocks (SBs) required to transmit the stored data based at least in part on a first modulation and coding scheme (MCS). The first MCS corresponds to a first channel performance level. Execution of the program instructions by one or more processors causes the one or more processors to estimate a link quality associated with the first number of SBs is estimated. Execution of the program instructions by one or more processors causes the one or more processors to determine a second MCS based at least in part on the estimated link quality. The second MCS corresponds to a second channel performance level. Execution of the program instructions by one or more processors causes the one or more processors to determine whether the second channel performance level is less than the first channel performance level. Execution of the program instructions by one or more processors cause the one or more processors to select an operating MCS based at least in part on whether the second channel performance level is less than the first channel performance level. The stored data for transmission is scheduled based at least in part on the selected operating MCS.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The present invention advantageously provides an apparatus, system and method for performing modified link adaptation. Accordingly, the apparatus, system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 1:
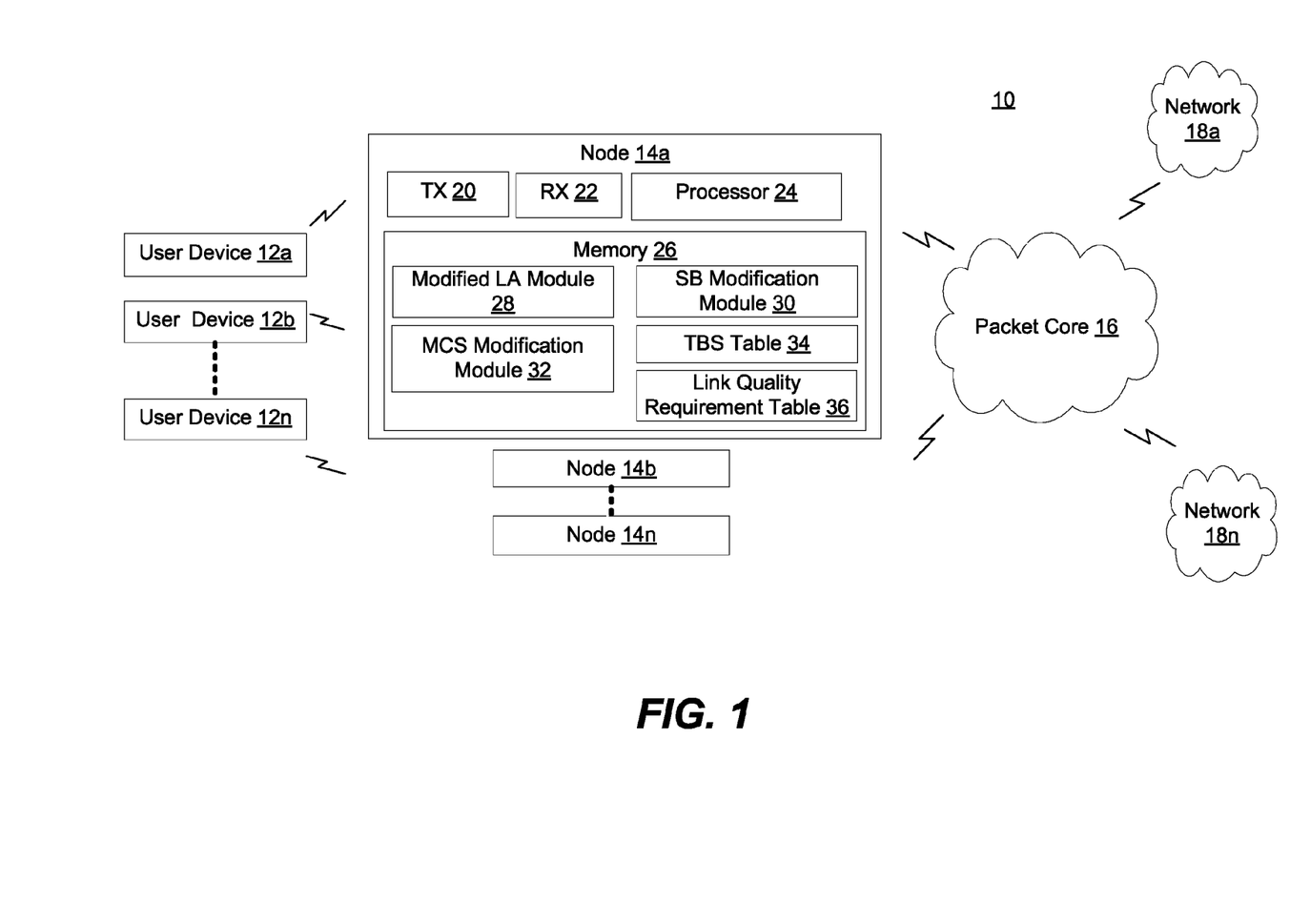
FIG. 1 is a block diagram of an exemplary communication system including modified link adaptation constructed in accordance with the principles of the present invention.

Referring now to the drawing figures in which like reference designators refer to like elements there is shown in FIG. 1 an exemplary communication system including modified link adaptation constructed in accordance with the principles of the present invention and designated generally as "10." System 10 may include one or more user devices 12a to 12n (collectively referred to as "user device 12"), one or more nodes 14a to 14n (collectively referred to as "node 14"), one or more packet cores 16 (collectively referred to as "packet core 16") and one or more communication networks 18a to 18n (collectively referred to as "network 18").

User device 12 may include transmitter and receiver (not shown) for communicating at least with node 14 and/or other user devices 12 via a communications network using communication protocols known in the art, e.g., using Internet Protocols along with long term evolution (LTE) wireless communication standards. The communication network may be a mobile or wireless communication network. User device 12 may include mobile devices, tablets, laptops, computers, personal digital assistants (PDAs), servers, LTE enabled user equipment (UE) and the like.

Node 14 includes transmitter 20, receiver 22, processor 24 and memory 26 in operative communication with each other. Transmitter 20 and receiver 22 provide transmission and reception of data communications to/from user device 12, other nodes 14 and packet core 16, among other communications devices, servers and networks. Node 14 includes processor 24 such as central processing unit (CPU) for performing node functions described herein. Node 14 may include memory 26. In particular, memory 26 may include non-volatile and volatile memory, e.g., non-transitory computer readable medium storing program instructions that may be executed by processor 24 such as to cause processor 24 to perform the functions described herein. Non-volatile memory may include a hard drive, flash memory, memory stick and the like. Also, volatile memory may include random access memory and other memory known in the art.

Memory 26 stores queued data, current transport block size (TBS), current modulation and coding scheme (MCS), current number of scheduling blocks (SBs), operating TBS, operating MCS and operating number of SBs. The current TBS, MCS and number of SBs correspond to a TBS, MCS and number of SBs, respectively, associated with a data queue during modified link adaptation, i.e., tracks the modified or estimated TBS, MCS and number of SBs for a data queue associated with user device 12 during modified link adaptation. The current TBS, MCS and number of SBs may be constantly updated during modified link adaptation, e.g., the current numbers of SBs may be updated after the number of SBs have been modified or estimated. The operating TBS, MCS and number of SBs corresponds to a modified link adaptation algorithm output for a data queue associated with user device 12, i.e., indicates the TBS, MCS and number of SBs that are to be utilized to transmit a data queue associated with user device 12, in which modified link adaptation may be performed one data queue at a time. The queued data corresponds to at least one code word, i.e., corresponds to user data before it has been formatted for transmission. The current and operating MCSs, number of SBs and TBSs may be reset to default values after modified link adaptation is performed for a data queue, e.g., current MCS may be reset back to the optimum or maximum MCS.

Memory 26 may also store modified link adaptation (LA) module 28, scheduling block (SB) modification module 30, MCS modification module 32, TBS table 34 and link quality requirement table 36, among other modules and tables. Memory 26 stores program instructions such as those for modified link adaptation module 28, SB modification module 30 and MCS modification module 32, among other modules.

Modified link adaption module 28 performs modified link adaptation. For example, modified link adaptation module 28 includes instructions, which when executed by processor 24, causes processor 24 to perform the modified link adaptation process, discussed in detail with respect to FIG. 4. SB modification module 30 performs the process of adjusting a number of SBs associated with a data queue during modified link adaptation. For example, SB modification module 30 includes instructions, which when executed by processor 24, causes processor 24 to perform the SB modification process, discussed in detail with respect to FIG. 5.

MCS modification module 32 adjusts the modulation and coding scheme to be utilized for transmitting a data queue associated with user device 12. For example, MCS modification module 32 includes instructions, which when executed by processor 24, causes processor 24 to perform the MCS modification process, discussed in detail below with respect to FIG. 6. TBS table 34 provides a mapping of a transport block size to a number of SBs and TBS index, discussed in detail with respect to FIG. 2. Link quality requirement table 36 provides a mapping of a link quality that is required to utilize a specific number of SBs and MCS index, discussed in detail with respect to FIG. 3.

Packet core 16 may be an Internet Protocol (IP) based core network. For example, packet core 16 may be an evolved packet core (EPC) network that is based on end-to-end IP based transmission in and out of the EPC network, e.g., all-IP based. Data and voice may be communicated through EPC via IP packets. Packet core 16 may include one or more serving gateways, packet distribution network gateways and mobile management entities (not shown), among other servers, gateways and entities. Network 18 may include communication networks such as wide area networks, local area networks and the like. Network 18 may provide various voice and data related services, content and the like to user device 12 via packet core 16.

Figure 2:
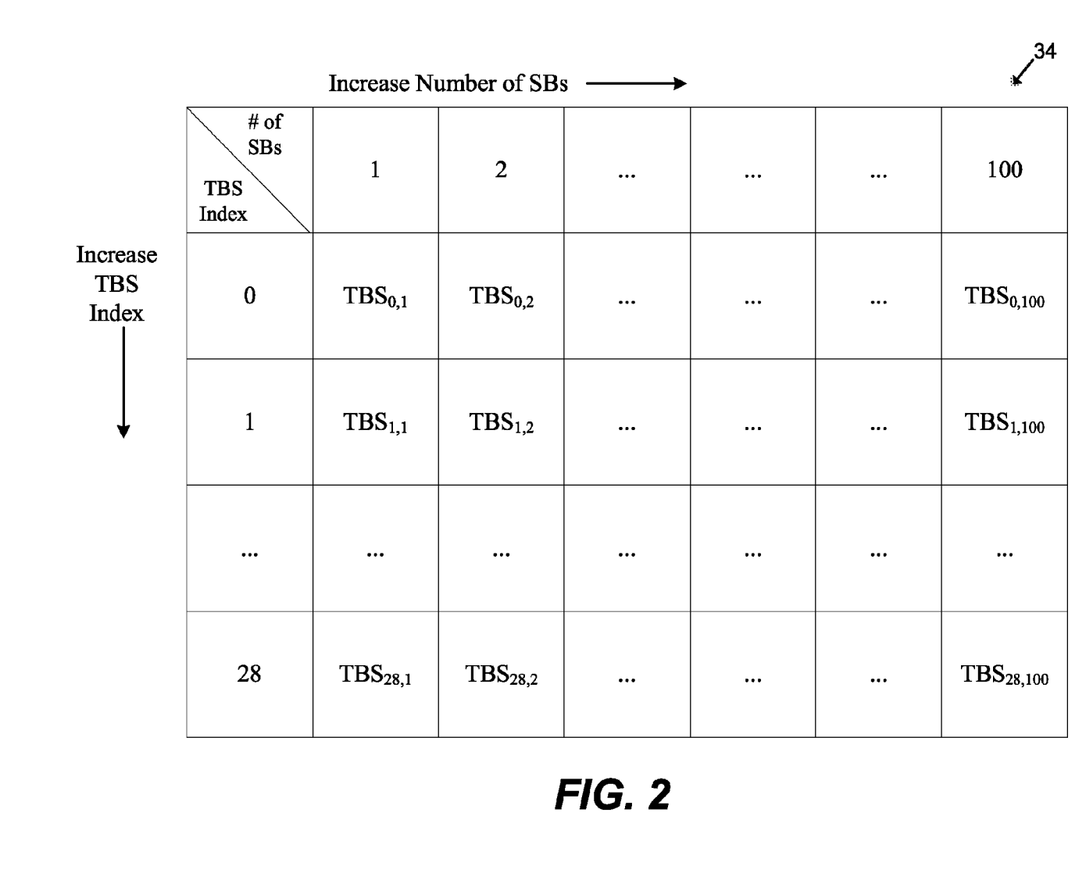
FIG. 2 is a transport block size (TBS) table arranged in accordance with the principles of the present invention.

An exemplary TBS table 34 is described with reference to FIG. 2. TBS table 34 associates a transport block size with a respective number of SBs and TBS index. The transport block size corresponds to a number of media access control (MAC) bits that can be transmitted in the subframe or TTI. For example, $TBS_{28,100}$ may correspond to a transport block size that can be accommodated with one hundred SBs ($SBs_{100}$) and a specific MCS associated with TBS index twenty eight ($TBS_{28}$). The higher TBS index number, the greater the channel performance level, e.g., the greater the data throughput. Also, the higher the number of SBs, the greater the data throughput. In particular, $TBS_{28,100}$ may correspond to a highest, optimum or maximum channel performance level given TBS indices from 0-28 and number of SBs from 0-100. While TBS table 34 is illustrated in FIG. 2 having a specific table size, e.g., TBS indices 0-28 and number of SBs 0-100, one of ordinary skill in the art will recognize that other table sizes and dimensions can be incorporated, i.e., the number of SBs and/or TBS indices may be increased or decreased. TBS table 34 may correspond to the transport block size table defined in $3^{rd}$ Generation Partnership Project Technical Specification (3GPP TS) 36.213, e.g., Table 7.1.7.2.1-1, which is herein incorporated by reference.

Figure 3:
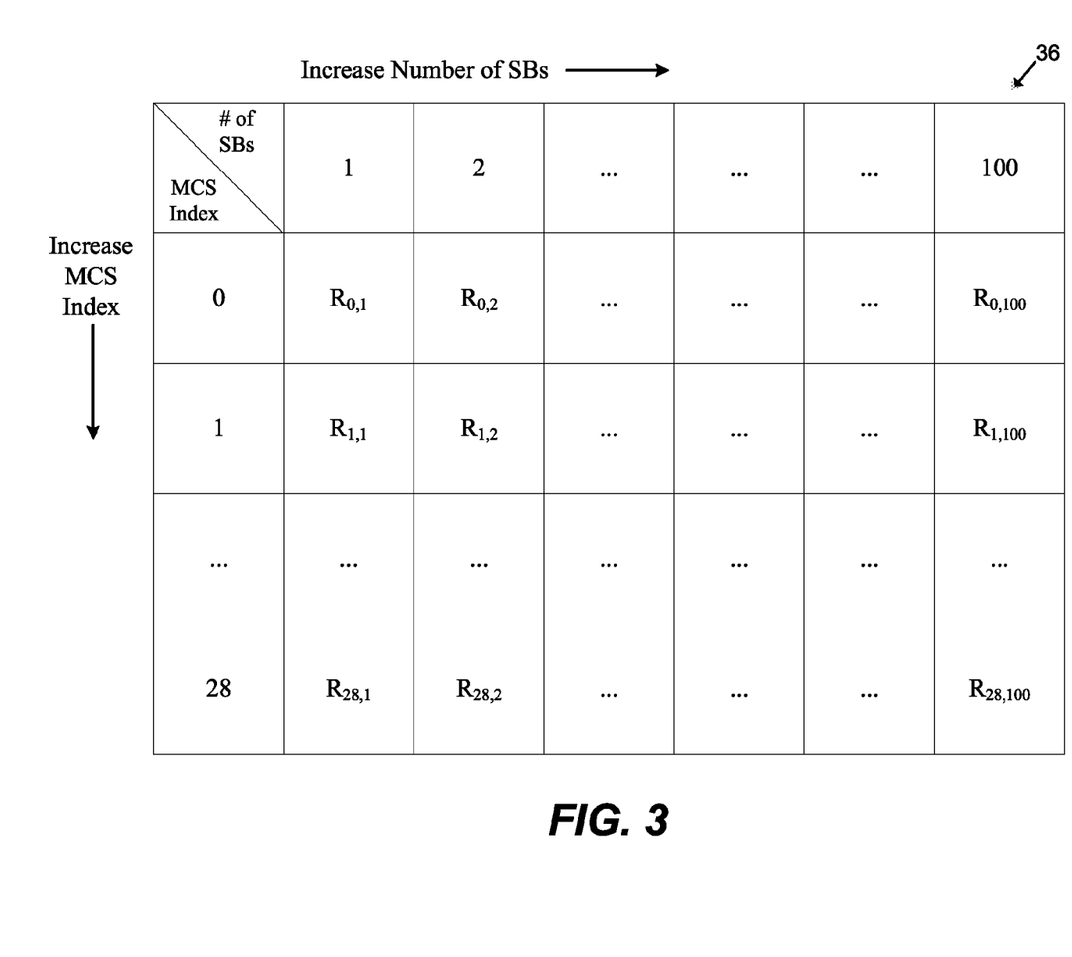
FIG. 3 is a link quality requirement table arranged in accordance with the principles of the present invention.

An exemplary link quality requirement table 36 is described with reference to FIG. 3. Link quality requirement table 36 associates a predetermined required link quality with a number of SBs and MCS index, i.e., associates a minimum link quality needed to utilize a specific number of SBs and MCS associated with a MCS index to transmit queued data. The required link quality is the minimum link quality needed to achieve a certain block error rate (BLER). The MCS index corresponds to a specific modulation scheme and channel coding, e.g., quadrature amplitude modulation having four (4) bits per symbol (16QAM) and a specific coding level. For example, link quality requirement, $R_{28,100}$, corresponds to a link quality that is required to utilize a MCS corresponding to MCS index twenty eight ($MCS_{28}$) and one hundred SBs ($SBs_{100}$) while achieving a targeted operating point such as a block error rate (BLER) with the maximum possible bit rate. $MCS_{28}$ is the maximum or optimum MCS that corresponds to a maximum or optimum channel performance level given $MCS_{0-28}$, e.g., the optimum MCS may correspond to the largest MCS index in table 36 or a minimum of the largest MCS index and maximum supported MCS.

The greater or higher the MCS index, the greater the channel performance level. The greater or higher the number of SBs, greater data throughput or bit rate. While link quality requirement table 36 is illustrated in FIG. 3 having a particular table size, i.e., MCS 0-28 and number of SBs 0-100, one of ordinary skill in the art will recognize that the table size may be adjusted based on system design and/or communication protocol standards, among other factors. For example, link quality requirement table 36 may have a table size corresponding to the table size of TBS table 34, or vice versa.

Figure 4:
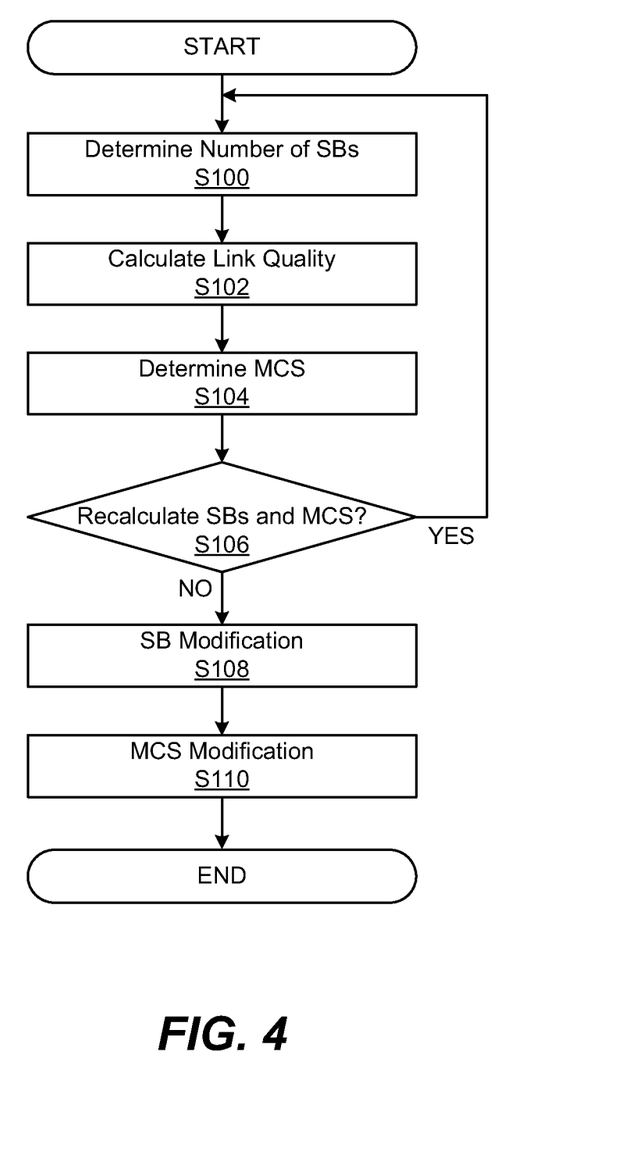
FIG. 4 is a flowchart of an exemplary modified link adaptation process in accordance with the principles of the present invention.

An exemplary modified link adaptation process is described with reference to FIG. 4. Processor 24 determines a number of SBs (Step S100). For example, processor 24 determines or estimates a first number of SBs (N_SBs_1) needed to empty a buffer based at least in part on the current MCS, i.e., estimate a number of SBs required to accommodate a data queue associated with user device 12 given the current MCS. The current MCS may initially be set to an optimum MCS such that the beginning of modified link adaptation for a given data queue is performed using the optimum MCS, i.e., Step S100 may be determined using the optimum MCS. The optimum MCS may correspond to a maximum channel performance level such as $MCS_{28}$ illustrated in FIG. 3. For example, MCS index twenty eight ($MCS_{28}$) may correspond to a channel performance level greater than the channel performance levels associated with MCS indices zero through twenty seven ($MCS_{0-27}$). The optimum MCS may be predetermined such that the MCS is determined before the transmission time interval (TTI) or before the beginning of link adaptation during TTI for user device 12.

In general, the number of SBs may be estimated based at least in part on equations (1) and/or (2) given a MCS, e.g., given an optimum MCS ($MCS_{max}$), etc.

$$N_{13}SBs = \text{ceiling}\{(1+\text{marginFactor})*TBS_{required}/[\text{bitsPerSB}(MCS)*SBStep]\}*SBStep \quad \text{Equation (1)}$$

$$N\_SBs\_1 = \min(N\_SBs, \text{max number of available } SBs). \quad \text{Equation (2)}$$

The marginFactor indicates scaling on the required TBS. The marginFactor may be optimized, i.e., increased or decreased, based on simulations or field testing. The required TBS ($TBS_{required}$) corresponds to a target TBS determined based on a desired TBS ($TBS_{desired}$), minimum TBS ($TBS_{min}$) and maximum TBS ($TBS_{max}$). In particular, the required TBS may be the minimum of $TBS_{max}$ and a maximum of the $TBS_{desired}$ and $TBS_{min}$, i.e., $TBS_{required}$=min (max ($TBS_{desired}$, $TBS_{min}$), $TBS_{max}$). The desired TBS corresponds to the number of data bits in queue for user device 12. The minimum TBS corresponds to the smallest TBS that can carry a reasonable amount of user data. The minimum TBS may be predetermined based on communications protocols and/or may be set by a network operator based on design considerations. The maximum TBS may be based on user device 12 and/or node 14 capabilities, i.e., the maximum TBS supported by user device 12 and/or node 14. The maximum TBS may be predetermined based on communication protocols in accordance with LTE wireless communication standards and/or may be set by a network designer based on design considerations, among other factors. The bitsPerSB(MCS) corresponds to the average TBS per SB determined from TBS table 34 given a MCS level or index using all or a portion of the number of SBs, e.g., N out of 100 columns in TBS table 34 may be used to determine bitsPerSB given a MCS. SBStep corresponds to a granularity of SB assignment. SBStep may correspond to a minimum number of SBs that can be allocated at a time, i.e., one or more SBs may be assigned or allocated at a time. N_SBs_1 corresponds to the minimum number of SBs from equation 1 (N_SBs) and the maximum number of available SBs ($SBs_{available}$), i.e., N_SBs_1=min (N_SBs, $SBs_{available}$). For example, the minimum of the current number of SBs and maximum number of available SBs may be performed.

Processor 24 may calculate or estimate a link quality based on a channel quality associated with the number of SBs and/or the actual location of the number of SBs in frequency, e.g., estimate link quality based at least in part on the channel quality associated with N_SBs_1 (Step S102). For example, the link quality for a specific user device 12 may be calculated from measurements or via reporting of channel state information (CSI). The calculation or estimation of link quality is specific to each user and dynamic in time. Processor 24 may determine a MCS, e.g., a second MCS (MCS_1) may be determined by searching link quality requirement table 36 for a maximum MCS (Step S104). For example, link quality requirement table 36 is searched for a maximum MCS that satisfies a link quality threshold given a number of SBs such as N_SBs_1. The link quality threshold may be the calculated link quality divided by the required link quality that is greater than or equal to one minus a link quality margin, i.e., (calculated link quality/required link quality)≥(1−link quality margin). The required link quality is given by $R_{x,y}$, where x is the MCS index and y is the number of SBs such that the required link quality $R_{x,y}$ indicates a minimum link quality needed to utilize an MCS corresponding to MCS index (x) and a number of SBs (y). The current MCS may be updated to indicate the maximum MCS corresponding the maximum MCS index, e.g., updated to indicate the MCS_1 after MCS_1 is determined. While a lesser or lower MCS level than the current MCS, e.g., MCS_1, may satisfy the link quality threshold, the lesser MCS will likely result in channel coding that is too robust, thereby leading to a lower throughput and lower BLER than the target.

Processor 24 determines whether to recalculate the number of SBs and MCS, i.e., whether to repeat Steps S100-S104 (Step S106). Processor 24 may determine to recalculate the number of SBs and MCS if the current MCS is less than a maximum MCS ($MCS_{max}$) and the current number of SBs is less than the available number of SBs ($SBs_{available}$), i.e., if $MCS<MCS_{max}$ and if $SBs<SBs_{available}$. If processor 24 makes the determination to recalculate the number of SBs and MCS, the Step of S100 may be performed using the MCS determined in Step S104 from the previous iteration or loop of Steps S100-S104. The process may then continue to Step S102, as discussed above, using the recalculated number of SBs. A particular version or calculation of the number of SBs and MCS may be referred to as N_SBs_n and MCS_n, respectively, in which n is a positive integer that indicates the version of the number of SBs and MCS such that later version correspond to a higher n value. For example, N_SBs_2 may be calculated based at least in part on MCS_1 in which N_SBs_2 indicates a later version or calculation of the number of SBs than indicated by N_SBs_1. Recalculations of the number of SBs and MCS may be indicated by n greater than one.

If processor 24 determines not to recalculate the number of SBs, i.e., processor 24 determines $MCS=MCS_{max}$ or $SBs=SBs_{available}$, processor 24 may perform SB modification (Step S108). SB modification may include modifying or re-estimating another number of SBs required to empty the buffer, among other functions described in detail with respect to FIG. 5. After SB modification, MCS modification may be performed (Step S110). MCS modification may include reducing and/or increasing the MCS, i.e., decreasing and/or increasing the current MCS. MCS modification is discussed in detail with respect to FIG. 6. After MCS modification is performed, the data queue may be scheduled for transmission based at least in part on the operating TBS, number of SBs and MCS that result from performing modified link adaptation.

Figure 5:
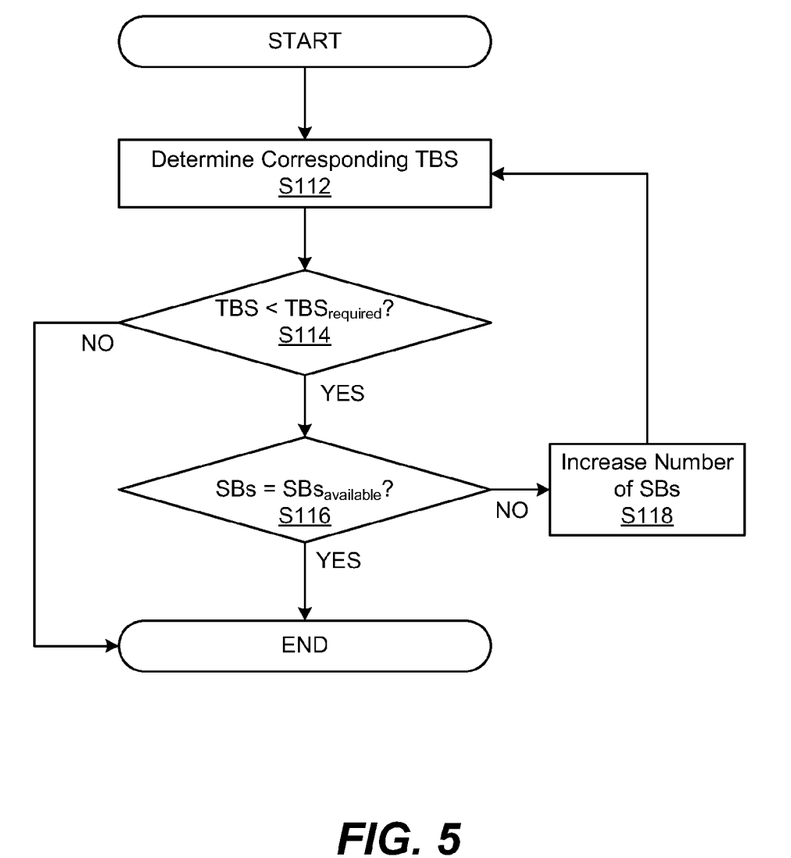
FIG. 5 is a flowchart of an exemplary scheduling block (SB) modification process in accordance with the principles of the present invention.

An exemplary SB modification process is described with reference to FIG. 5. Processor 24 determines a TBS based at least in part on a number of SBs and MCS (Step S112). Processor 24 determines a current TBS based at least in part on the current number of SBs, e.g., N_SBs_1 or N_SBs_2, and current MCS, e.g., MCS_1 or MCS_2. For example, the current TBS is determined by searching the TBS table 34 for a TBS given the current number of SBs and TBS index corresponding to the MCS. In yet another example, the current TBS may be determined to be $TBS_{24,80}$ based on a current number of SBs ($SBs_{80}$) and MCS index twenty-four ($MCS_{24}$) that corresponds to TBS index twenty-four ($TBS_{24}$). The TBS index in TBS table 34 may map directly with an MCS index in the link quality requirement table 36, e.g., TBS indices one ($TBS_1$) and twenty-eight ($TBS_{28}$) correspond to MCS index one ($MCS_1$) and twenty-eight ($MCS_{28}$), respectively. One of ordinary skill in the art will recognized that other mappings of the MCS index to TBS index may be used, e.g., MCS index twenty-eight ($MCS_{28}$) may map to TBS index twenty-six ($TBS_{26}$).

Processor 24 determines whether the TBS is less than the required TBS, i.e., whether $TBS<TBS_{required}$ (Step S114). For example, processor 24 may determine whether the current TBS determined in Step S112 is less than $TBS_{required}$ where $TBS_{required}=\min(\max(TBS_{desired}, TBS_{min}), TBS_{max})$. If the determination is made that the current TBS is equal to or greater than the required TBS, SB modification may end since then the current TBS is large enough to accommodate a data queue, i.e., the current TBS is large enough to empty the buffer or the maximum/highest limit for transmission has been reached. If the determination is made that the TBS is less than the required TBS, a determination is made whether the current number of SBs equals the maximum number of available SBs, i.e., whether N_SBs_1 or N_SBs_2 equals $SBs_{available}$ (Step S116). If the determination is made that the current number of SBs equals the maximum number of available SBs, SB modification may end, e.g., all SBs in a given TTI are going to be used to transmit data such that the current number of SBs cannot be increased. If the determination is made that the current number of SBs does not equal the maximum number of available SBs, the number of SBs may be increased (Step S118). For example, the current number of SBs such as N_SBs_1 or N_SBs_2 may be increased by a predetermined number of SBs such as by SBStep. After increasing the current number of SBs by a predetermined amount, e.g., by SBStep, the determination of Step S112 may be repeated.

Figure 6:
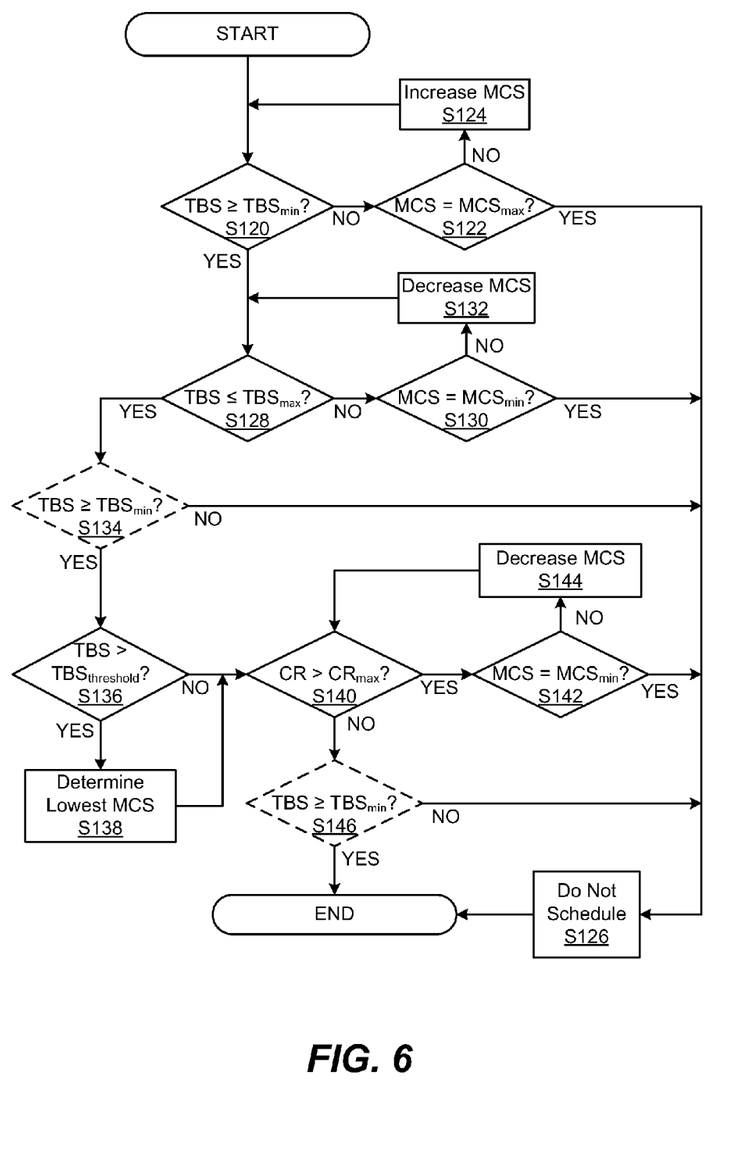
FIG. 6 is a flowchart of an exemplary modulation and coding scheme (MCS) modification process in accordance with the principles of the present invention.

An exemplary MCS modification process is described with reference to FIG. 6. Processor 24 determines whether TBS is greater than or equal to a minimum TBS, i.e., whether $TBS \geq TBS_{min}$ (Step S120). For example, a determination is made whether the TBS associated with the current MCS such as MCS_2 and the current number of SBs such as N_SBs_2 can carry a minimum amount of user traffic or data ($TBS_{min}$). If the TBS is determined not to be greater than or equal to the minimum TBS, processor 24 determines whether the MCS is equal to a maximum MCS, i.e., whether $MCS=MCS_{max}$ (Step S122). If the determination is made that the current MCS does not equal the maximum MCS, the current MCS is increased while keeping the current number of SBs the same, i.e., MCS index is increased by one or more index levels while the number of SBs are keep constant (Step S124). For example, MCS_2 may be increased while keeping N_SBs_2 the same. The current TBS and MCS may be updated based on the increased MCS. After increasing the MCS, the determination of Step S120 may be repeated.

Referring back to Step S122, if the determination is made that MCS is equal to the maximum MCS, the data queue associated with user device 12 may not be scheduled, i.e., a data queue associated with user device 12 cannot be accommodated during the current TTI (Step S126). For example, the current MCS cannot be increased in order to transmit the smallest TBS that can carry a minimum or reasonable amount of data to user device 12. The modified link adaptation process may be performed again for the data queue during the next TTI interval in which a greater number of SBs may be available as no data queue has been scheduled within the TTI and/or the calculated link quality may change, among other factors may vary per TTI when performing modified link adaptation.

Referring back to Step S120, if the determination is made that TBS is greater than or equal to the minimum TBS, processor 24 determines whether TBS is less than or equal to the maximum TBS, i.e., whether TBS≤$TBS_{max}$ (Step S128). The maximum TBS may be based at least in part on the capabilities of user device 12 and/or node 14, e.g., a maximum TBS supported by user device 12 associated with the queued data. If processor 24 determines the current TBS is not less than or equal to the maximum TBS, a determination is made whether the current MCS is equal to the minimum MCS, i.e., whether MCS=$MCS_{min}$ (Step S130). The minimum MCS may correspond to a minimum or most robust channel performance level, e.g., $MCS_0$ given $MCS_{0-28}$. If processor 24 determines that the MCS is equal to the minimum MCS, the data queue associated with user device 12 may not be scheduled (Step S126). For example, the current MCS cannot be decreased such that the current TBS remains greater than the maximum TBS ($TBS_{max}$). The modified link adaptation process may be performed again for the queued data during the next TTI. If processor 24 determines the current MCS does not equal the minimum MCS, the current MCS is decreased (Step S132). For example, the current MCS may be decreased by one or more MCS levels while the current number of SBs are kept constant. The current TBS may be updated based on the decreased MCS and current number of SBs. After MCS is decreased, the determination of Step S128 may be repeated.

Referring back to Step S128, if the determination is made that the TBS is less than or equal to the maximum TBS, processor 24 may determine whether the current TBS is greater than or equal to the minimum TBS (Step S134). The determination of Step S134 may only be performed if the MCS is decreased at Step S132, i.e., Step S134 is skipped if Step S132 is not performed. In particular, the current number of SBs and decreased MCS may correspond to a TBS that is not greater than or equal to the minimum TBS such that the current TBS should be checked after decreasing MCS. Alternatively, the determination of Step S134 may always be performed. If the determination is made that TBS is not greater than or equal to the minimum TBS, the data queue associated with user device 12 may not be scheduled (Step S126). If the determination is made that TBS is greater than or equal to the minimum TBS, processor 24 determines whether the TBS is greater than a threshold TBS, i.e., whether TBS>$TBS_{threshold}$ (Step S136). The TBS threshold may correspond to a TBS obtained by multiplying the required TBS by a margin, i.e., $TBS_{threshold}$=$TBS_{required}$*$TBS_{margin}$. The TBS margin is a value greater than one or a scaling that can be optimized through simulations and/or field testing, and may be configurable during link adaptation.

If the determination is made that TBS is greater than the threshold TBS, processor 24 may determine a lowest MCS (Step S138). The lowest MCS may correspond to a lowest temporary MCS ($MCS_{temp}$) that is less than or equal to the current MCS in which a TBS based at least in part to the temporary MCS is greater than or equal to the required TBS, i.e., lowest $MCS_{temp}$ is determined such that $MCS_{temp}$≤MCS and TBS ($MCS_{temp}$)≥$TBS_{required}$. The current MCS and TBS may be updated after Step S138 is performed, and Step S140 may be performed as discussed below.

Referring back to Step S136, if the determination is made that TBS is not greater than the threshold TBS, processor 24 determines whether a code rate is greater than a maximum code rate (Step S140). The code rate (CR) is determined based at least in part on the current MCS and/or current number of SBs. The maximum code rate ($CR_{max}$) is a maximum code rate supported by user device 12. If the determination is made that the code rate is greater than the maximum code rate, processor 24 determines whether the current MCS is equal to the minimum MCS (Step S142). If the determination is a made that MCS is equal to the minimum MCS, the data queue associated with user device 12 may not be scheduled, i.e., a data queue associated with user device 12 cannot be accommodated during the current TTI (Step S126). For example, the current MCS cannot be decreased such that the code rate remains greater than the maximum code rate. If the determination is made that MCS is not equal to the minimum MCS, the MCS is decreased (Step S144). For example, the current MCS may be decreased by one or more MCS levels. After MCS is decreased, the determination of Step S140 may be repeated.

Referring again to Step S140, if the determination is made that the code rate is not greater than the maximum code rate, processor 24 may determine whether the current TBS is greater than or equal to the minimum TBS as discussed above with respect to Step S134 (Step S146). In particular, Step S146 may only be performed if the MCS is decreased at Step S144, i.e., Step S146 is skipped if Step S144 is not performed. If the determination is made that the current TBS is not greater than or equal to the minimum TBS, the data queue associated with user device 12 may not be scheduled, i.e., a data queue associated with user device 12 cannot be accommodated during the current TTI (Step S126). If the determination is made that the current TBS is greater than or equal to the minimum TBS, the MCS modification process may end.

The current MCS and number of SBs may be updated after the MCS modification process, and the operating MCS and number of SBs may be set to the current MCS and number of SBs for a data queue such that a data queue associated with user device 12 is scheduled for transmission, i.e., the operating TBS is determined based on the operating MCS and number of SBs such that the queued data is scheduled for transmission based at least in part on the operating TBS. The operating TBS, MCS and number of SBs indicate the final result of the modified link adaptation process for a data queue associated with user device 12. The modified link adaptation process of FIG. 4 may be performed for other data queues associated with the same or different user device 12, i.e., the modified link adaptation process is repeated for another data queue. The modified link adaptation process of FIG. 4 may be performed for as many data queues as needed given the time left in the TTI, i.e., modified link adaptation may be performed for one or more data queues during a given TTI.

The performance of table based modified link adaptation often results in the highest MCS supported by the link quality being selected for queued data. With table based modified link adaptation, the link adaptation processing time may be significantly reduced compared to a brute force search method that attempts to search through all MCS values and all number of SBs, i.e., searches through all possibilities.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A radio resource management apparatus, the apparatus comprising:
    a memory, the memory configured to store data associated with a user device;
    a processor in communication with the memory, the processor configured to:
        estimate a first number of scheduling blocks, SBs, required to transmit the stored data based at least in part on a first modulation and coding scheme, MCS, the first MCS corresponding to a first channel performance level;
        estimate a link quality associated with the first number of SBs;
        determine a second MCS based at least in part on the estimated link quality, the second MCS corresponding to a second channel performance level;
        determine whether the second channel performance level is less than the first channel performance level; and
        select an operating MCS based at least in part on whether the second channel performance level is less than the first channel performance level, the stored data being scheduled for transmission based at least in part on the selected operating MCS.

2. The apparatus of claim 1, wherein the memory is further configured to store at least one table, the at least one table associating a link quality requirement with a specific number of SBs and a specific MCS; and
    the second MCS is determined based at least in part by searching the at least one table using the first number of SBs and the estimated link quality.

3. The apparatus of claim 1, wherein the first channel performance level corresponds to an optimum channel performance level associated with at least one table that correlates a link quality requirement with a specific MCS and a specific number of SBs.

4. The apparatus of claim 3, wherein the processor is further configured to estimate a second number of SBs based at least in part on the second MCS when the second channel performance level is less than the first channel performance level, the second number of SBs being greater than the first number of SBs.

5. The apparatus of claim 4, wherein the memory is further configured to store the at least one table; and
    the processor is further configured to:
        estimate a second link quality associated with the second number of SBs; and
        search the at least one table for a third MCS corresponding to a third channel performance level based at least in part on the second number of SBs and the second estimated link quality, the third channel performance level being less than the channel performance level associated with the first MCS.

6. The apparatus of claim 5, wherein the operating MCS is the third MCS determined by the search.

7. The apparatus of claim 5, wherein the processor is further configured to:
    calculate a transport block size, TBS, corresponding to the third MCS and the second number of SBs; and
    determine whether the TBS is large enough to transmit the stored data in a single transmission time interval, TTI.

8. The apparatus of claim 7, wherein the processor is further configured to increase the second number of SBs, while the third MCS is maintained, in response to determining the TBS is not large enough to transmit the stored data in the single TTI.

9. The apparatus of claim 8, wherein the processor is further configured to:
    calculate a second TBS based at least in part on the increased second number of SBs and third MCS;
    determine whether the second TBS exceeds a predetermined threshold; and
    reduce the third MCS, while maintaining the increased second number of SBs, in response to determining the second TBS exceeds the predetermined threshold, the operating MCS being the reduced third MCS.

10. The apparatus of claim 9, wherein the predetermined threshold is a maximum TBS, the maximum TBS indicating a maximum amount of bits per transmission time interval, TTI.

11. The apparatus of claim 8, wherein the processor is further configured to:
    determine a code rate based at least in part on the increased second number of SBs and third MCS;
    determine whether the code rate exceeds a predetermined code rate threshold; and
    reduce the third MCS, while maintaining the increased second number of SBs, in response to determining the code rate exceeds the predetermined code rate threshold, the operating MCS being the reduced third MCS.

12. The apparatus of claim 5, wherein the processor is further configured to:
    calculate a transport block size, TBS, corresponding to the third MCS and the second number of SBs;
    determine whether the TBS is less than a minimum TBS, the minimum TBS corresponding to a predetermined TBS size; and
    increase the third MCS, while maintaining the second number of SBs, in response to determining the TBS is less than the minimum TBS.

13. The apparatus of claim 1, wherein the first number of SBs is based at least in part on one of a required TBS, a granularity of SBs assignment, available number of SBs and an average number of bits per SB.

14. A method for link adaptation, the method comprising:
storing data associated with a user device;
estimating a first number of scheduling blocks, SBs, required to transmit the stored data based at least in part on a first modulation and coding scheme, MCS, the first MCS corresponding to a first channel performance level;
estimating a link quality associated with the first number of SBs;
determining a second MCS based at least in part on the estimated link quality, the second MCS corresponding to a second channel performance level;
determining whether second channel performance level is less than the first channel performance level; and
selecting an operating MCS based at least in part on whether second channel performance level is less than the first channel performance level, the stored data being scheduled for transmission based at least in part on the selected operating MCS.

15. The method of claim 14, wherein the memory is further configured to store at least one table, the at least one table associating a link quality requirement with a specific number of SBs and a specific MCS; and
the second MCS is determined at least in part by searching the at least one table based at least in part on the first number of SBs and the estimated link quality.

16. The method of claim 14, wherein the first channel performance level corresponds to an optimum channel performance level associated with at least one table that correlates a link quality requirement with a specific MCS and a specific number of SBs.

17. The method of claim 16, further comprising estimating a second number of SBs based at least in part on the second MCS when the second channel performance level is less than the first channel performance level, the second number of SBs being greater than the first number of SBs.

18. The method of claim 17, further comprising storing the at least one table; and
searching the at least one table for a third MCS having a corresponding third channel performance level based at least in part on the second number of SBs, the third channel performance level being less than the channel performance level associated with the first MCS.

19. The method of claim 18, wherein the operating MCS is the third MCS determined by the search.

20. The method of claim 18, further comprising:
calculating a transport block size, TBS, corresponding to the third MCS and the second number of SBs; and
determining whether the TBS is large enough to transmit the stored data in a single transmission time interval, TTI.

21. The method of claim 20, further comprising increasing the second number of SBs, while the third MCS is maintained, in response to determining the TBS is not large enough to transmit the data in the single TTI.

22. The method of claim 21, further comprising:
calculating a transport block size, TBS, corresponding to the third MCS and the increased second number of SBs;
determining whether the TBS exceeds a predetermined threshold;
reducing the third MCS, while maintaining the increased second number of SBs, in response to determining the TBS exceeds the predetermined threshold; and
setting the operating MCS to the reduced third MCS.

23. The method of claim 22, wherein the predetermined threshold is a maximum TBS, the maximum TBS indicating a maximum amount of bits per transmission time interval, TTI.

24. The method of claim 21, wherein the processor is further configured to:
determine a code rate based at least in part on the increased second number of SBs and the third MCS;
determine whether the code rate exceeds a predetermined code rate threshold; and
reduce the third MCS, while maintaining the increased second number of SBs, in response to determining the code rate exceeds the predetermined code rate threshold, the operating MCS being the reduced third MCS.

25. A non-transitory computer readable medium storing program instructions for performing link adaptation, which when executed by at least one processor, causes the at least one processor to:
estimate a first number of scheduling blocks, SBs, required to transmit stored data associated with a user device based at least in part on a first modulation and coding scheme, MCS, the first MCS corresponding to a first channel performance level;
estimate a link quality associated with the first number of SBs;
determine a second MCS based at least in part on the estimated link quality, the second MCS corresponding to a second channel performance level;
determine whether the second channel performance level is less than the first channel performance level; and
select an operating MCS based at least in part on whether the second channel performance level is less than the first channel performance level, the stored data is scheduled for transmission based at least in part on the selected operating MCS.

* * * * *